UNITED STATES PATENT OFFICE.

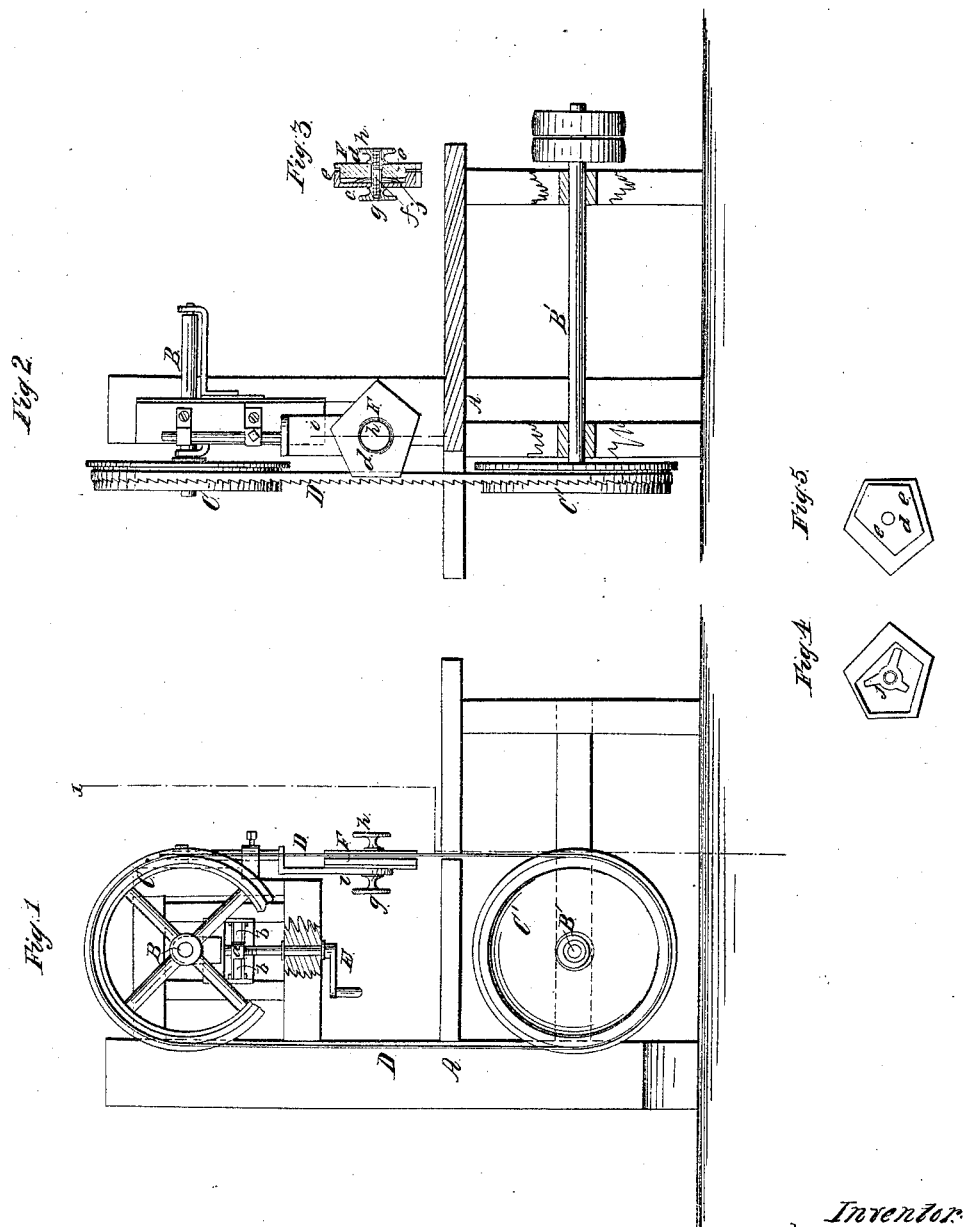

PAUL PRYIBIL, OF NEW YORK, N. Y.

IMPROVEMENT IN SAW-MILLS.

Specification forming part of Letters Patent No. 57,565, dated August 28, 1866.

*To all whom it may concern:*

Be it known that I, PAUL PRYIBIL, of the city, county, and State of New York, have invented a new and useful Improvement in Band-Saws; and I do hereby declare that the following is a full, clear, and exact description thereof, which will enable others skilled in the art to make and use the same, reference being had to the accompanying drawings, forming part of this specification, in which—

Figure 1 represents a sectional front elevation of this invention. Fig. 2 is a longitudinal vertical section of the same, taken in the plane indicated by the line $x\ x$, Fig. 1. Fig. 3 is a detached section of the saw-guide. Figs. 4 and 5 are detached elevations of the two jaws of the guide.

Similar letters of reference indicate like parts.

This invention consists in the arrangement of an adjustable guide, which is composed of two jaws that are connected to a central screw and provided with a series of shoulders of different widths, in such a manner that the guide can be readily adapted to saws of different widths simply by turning it round on its central screw.

It consists, further, in the arrangement of a yielding or elastic support under the adjustable journal-box of one of the drums, over which the saw runs in such a manner that if the saw strikes a knot or hard spot the journal-box is permitted to yield sufficiently to prevent the saw from snapping.

A represents a frame, which forms the bearings for the shafts B B' of the drums C C', over which the saw D is stretched. The journal-box of the upper shaft, B, is adjustable up and down by a hand-screw, F, which bears on the under surface of said box, as clearly shown in Fig. 1, and this screw is fitted in a nut, $a$, which is supported by spring-arms $b$ in such a manner that the bearing of the shaft B is rendered yielding, and the saw is permitted to give in case it strikes a knot in the wood, thereby preventing said saw from breaking.

Instead of the spring-arms $b$, any other suitable yielding support may be applied to the journal-box of the shaft B without altering the result.

F is the guide of the saw, which must be so constructed that it supports the back of the saw and steadies the same laterally. In order to adapt this guide to saws of different width and thickness I have constructed it of two jaws, $c\ d$, one of which is concave to receive the projecting shoulder $e$ of the other jaw. Said jaws are made two or more sided, and the width of the shoulder $e$, on the different sides of the jaw $d$, varies to correspond to the varying widths of different saws, so that by turning the guide on its center screw, $f$, it adapts itself to saws of different widths. The screw $f$ is provided with two nuts, $g\ h$, one of which serves to secure the jaw $c$ to the bracket $i$, which forms the support of the guide, while the other serves to compress the two jaws, and a spring, $j$, which is placed between the two jaws of the guide, has a tendency to keep the same open. By the combined action of this spring and of the nut $h$ the guide can be readily adjusted to the varying thicknesses of different saws, and a guide is obtained which is easily adjusted to different saws and which saves much time in operating band-saws.

In practice, the guide will be made five or six sided, as shown, so that one guide serves for all sizes of saws which are or may be used.

What I claim as new, and desire to secure by Letters Patent, is—

1. The changeable guide F, for the purpose set forth.

2. The construction of the guide F with shoulder $e$, screw $f$, nut $h$, spring $j$, and jaws $c\ d$, substantially as and for the purposes described.

3. The yielding spring-arms $b$, or their equivalent, in combination with the adjustable journal-box of the shaft B, substantially as and for the purpose set forth.

PAUL PRYIBIL.

Witnesses:
WM. F. MCNAMARA,
ALEX. F. ROBERTS.